United States Patent
Dopf et al.

(10) Patent No.: US 6,956,791 B2
(45) Date of Patent: Oct. 18, 2005

(54) APPARATUS FOR RECEIVING DOWNHOLE ACOUSTIC SIGNALS

(75) Inventors: Anthony R. Dopf, Calgary (CA); Paul L. Camwell, Calgary (CA); Wendall L. Siemens, Calgary (CA); Derek W. Logan, Calgary (CA)

(73) Assignee: XAcT Downhole Telemetry Inc., Calgary (CA)

( * ) Notice: Subject to any disclaimer, the term of this patent is extended or adjusted under 35 U.S.C. 154(b) by 438 days.

(21) Appl. No.: 10/354,157

(22) Filed: Jan. 28, 2003

(65) Prior Publication Data

US 2004/0145970 A1 Jul. 29, 2004

(51) Int. Cl.[7] ............................................. H04V 9/00
(52) U.S. Cl. .................. 367/82; 340/854.4; 73/152.32; 73/152.16; 181/102; 181/104
(58) Field of Search ........................ 367/82; 340/854.4; 73/152.16, 152.32; 181/102, 104

(56) References Cited

U.S. PATENT DOCUMENTS

| | | | | |
|---|---|---|---|---|
| 4,021,773 A | | 5/1977 | Keenan ................. 340/18 LD |
| 5,148,408 A | * | 9/1992 | Matthews .................... 367/82 |
| 5,248,857 A | * | 9/1993 | Ollivier ...................... 181/102 |
| 5,924,499 A | * | 7/1999 | Birchak et al. .............. 175/40 |
| 6,075,461 A | * | 6/2000 | Smith ....................... 340/853.7 |
| 6,137,747 A | * | 10/2000 | Shah et al. .................... 367/81 |
| 6,147,932 A | * | 11/2000 | Drumheller ................. 367/165 |
| 6,310,829 B1 | * | 10/2001 | Green et al. .................. 367/82 |
| 6,320,820 B1 | | 11/2001 | Gardner et al. ............... 367/81 |
| 6,450,258 B2 | * | 9/2002 | Green et al. ........... 166/250.17 |

OTHER PUBLICATIONS

Besalsow et al., "Development of a Surface Drillstring Vibration Measurement System," at *60th Annual Technical Conference and Exhibition of the Society of Petroleum Engineers*, Las Vegas, Nevada, Sep. 22–25, 1985, pp. 1–14.
Besalsow et al., "Application of ADAMS (Advanced Drillstring Analysis and Measurement System) and Improved Drilling Performance," at *1990 IADC/SPE Drilling Conference*, Houston, Texas, Feb. 27–Mar. 2, 1990, pp. 717–722.

* cited by examiner

*Primary Examiner*—Albert K. Wong
(74) *Attorney, Agent, or Firm*—Seed IP Law Group PLLC

(57) ABSTRACT

The invention relates to an apparatus for receiving downhole acoustic signals, processing the signals into electric signals, then transmitting the signals wirelessly to a remote above-surface monitoring station. The apparatus is mountable to an above-surface rotatable component used in borehole application. The apparatus includes an instrument housing, and a clamping assembly attached to the housing and having sufficient length and flexibility to enable the apparatus to surround the perimeter of the rotatable component.

8 Claims, 7 Drawing Sheets

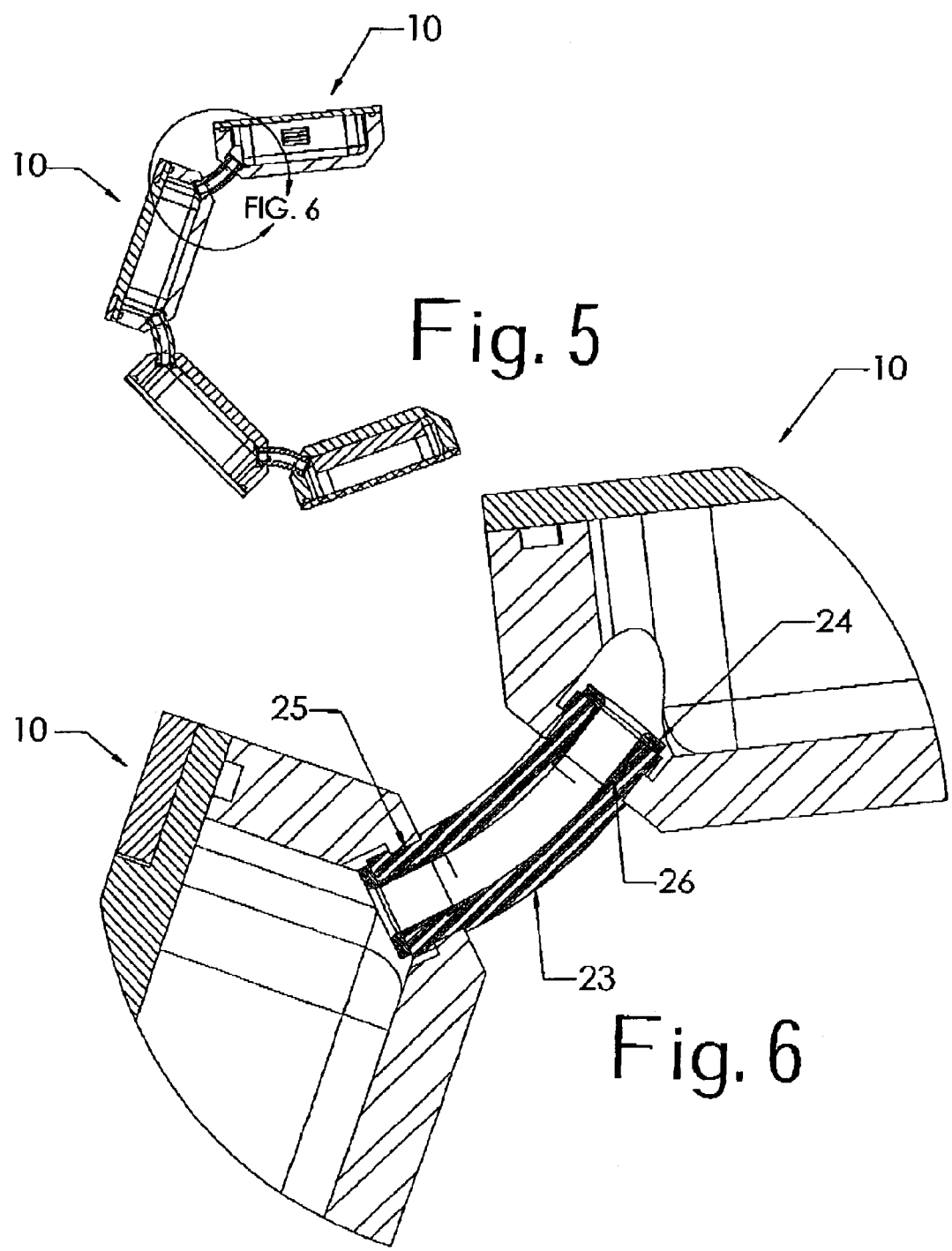

APPARATUS FOR RECEIVING DOWNHOLE ACOUSTIC SIGNALS

FIELD OF THE INVENTION

The invention relates generally to an apparatus for receiving downhole acoustic signals.

BACKGROUND OF THE INVENTION

Real-time collection of navigation and other relevant downhole data at a drill bit and transmission of the data to a surface rig is a common practice in off-shore and land-based drilling rigs. This technology has been called "Measurement-While-Drilling" (MWD). Logging data may also be transmitted uphole, and if so, the technology is referred to as Logging-While-Drilling (LWD).

Current commercialized MWD and LWD technologies include mud pulse telemetry, in which pressure pulses are generated in the mud by periodically constricting the flow through the drill string. However, the data transmission rates using mud pulse telemetry are slow (<1 binary bit/second), which limits the type of data that can be usefully collected. Wireline telemetry has been used in the industry, and provides greater data throughput than mud pulse telemetry, but electric cables that are used to transmit data up and down the drill string are vulnerable to damage and impose limitations to the operation of the drill string.

Wireless telemetry technology other than mud pulse telemetry has been developed that avoids the physical limitations of wireline cables and has a higher data transmission throughput than mud-pulse telemetry. Examples of wireless telemetry include electromagnetic telemetry, in which signals are sent as electromagnetic waves through the Earth. Electromagnetic Telemetry is limited to operating in areas where the formation resistivity is in an acceptable range to allow transmission.

Another type of wireless telemetry is acoustic telemetry, which involves the transmission of data with acoustic energy through such mediums as drill pipe. Acoustic telemetry applications include MWD, LWD, drill-stem-testing (DST), production, downhole pump performance, smart well completions, utility crossings and river crossings.

Several technological challenges exist with implementing acoustic telemetry technology in these applications. The complex wave physics associated with this type of data transmission require careful consideration to the design of the components of an acoustic telemetry system, which include a downhole sensor pack and transmitter, and an above-surface receiver. Technical challenges exist in ensuring that the above-surface receiver receives an acoustic signal with measurable strength and quality, and that the components of the telemetry system are robust, affordable and compatible with the drilling operation.

As an example, U.S. Pat. No. 6,320,820 describes an acoustic telemetry system in which an "acoustic telemetry receiver" is coupled to a kelly to receive transmitted telemetry signals. The telemetry receiver in this instance is a wired device, and thus cannot be used while tubulars are rotating. It is also bulky, limiting its placement on the drillstring to locations that may not be acoustically optimal.

Another application of acoustic telemetry technology in the drilling industry is above-ground acoustic monitoring of downhole acoustic signals from sources other than an acoustic transmitter. Monitoring applications include receiving timing information for seismic-while-drilling (SWD), monitoring drilling dynamics, air hammer monitoring, fluid hammer monitoring, casing drilling, and bottom hole assembly (BHA) retrieval and seating confirmation.

Examples of published monitoring systems includes the Advanced Drillstring Analysis and Measurement System (ADAMS) published in IADC/SPE paper 19998 and SPE paper 14327. The ADAMS comprises a measurement sub, a wireless telemetry system, and an instrumented trailer laboratory. The measurement sub must be inserted into the drillstring, to form a structural component, and is thus intrusive and not compatible with various drill collar connections without additional cross-over subs. This requires additional rig time to install, adds potential failure points, adds additional wear and tear to the drill string components, and affects rig operations such as pumping.

It is therefore desirable to provide an acoustic telemetry system that improves on at least some of the deficiencies of the state of the art.

SUMMARY OF THE INVENTION

According to one aspect of the invention, there is provided an apparatus for receiving downhole acoustic signals. The apparatus comprises at least one instrument housing made of an acoustically conductive material; the housing includes a contacting portion contactable with a rotatable above-surface component used in borehole applications in such a manner that acoustic signals from a downhole source conducted through the rotatable above-surface component is conducted through the housing. The apparatus also comprises instruments inside the housing, such as a transducer for converting acoustic signals conducted through the housing into electric signals, a data acquisition circuit communicative with the transducer, and a wireless transmitter communicative with the data acquisition circuit and for transmitting the electric signals to a remote destination. The apparatus also includes a clamping assembly attached to the instrument housing and having sufficient length and flexibility to enable the apparatus to surround the perimeter of the rotatable above-surface component; the clamping assembly includes a fastener configured to removably fasten the apparatus to the rotatable above-surface component, thereby enabling the apparatus to operate, while the rotatable above-surface component is rotating.

The clamping assembly may further include a plurality of members each pivotably connected to one or more of another member, the housing, and the fastener. At least some of the members may be removable, thereby enabling the clamping assembly length to conform to the perimeter of the rotatable above-surface component.

The housing contacting surface may further comprise at least one contact tooth for providing a high pressure contact interface between the housing and the rotatable above-surface component. The rotatable above-surface component may be selected from the group of a kelly and a saver sub of a drilling rig.

The apparatus may comprise a plurality of housings, and if so, the housings are pivotably connected to one or more of another housing, the clamping assembly member, and the fastener. Where a pair of housings are adjacent to each other, each adjacent housing may have a conduit opening, and the apparatus may further comprise a flexible conduit connected at each end to a conduit opening, and an electrical connector passing through the conduit and electrically connecting the instruments in one housing to the instruments in the adjacent housing.

The housing may further comprise an RF transparent portion, and an RF antenna mounted inside the housing such that the antenna can receive and transmit RF energy through the RF transparent portion.

BRIEF DESCRIPTION OF THE DRAWINGS

FIGS. 5 & 6 are schematic top sectioned views of adjacent housings of the apparatus and a flexible conduit interconnecting the housings.

FIG. 7b is a collapsed view of the housing of FIG. 7a.

DETAILED DESCRIPTION

Figure 1:
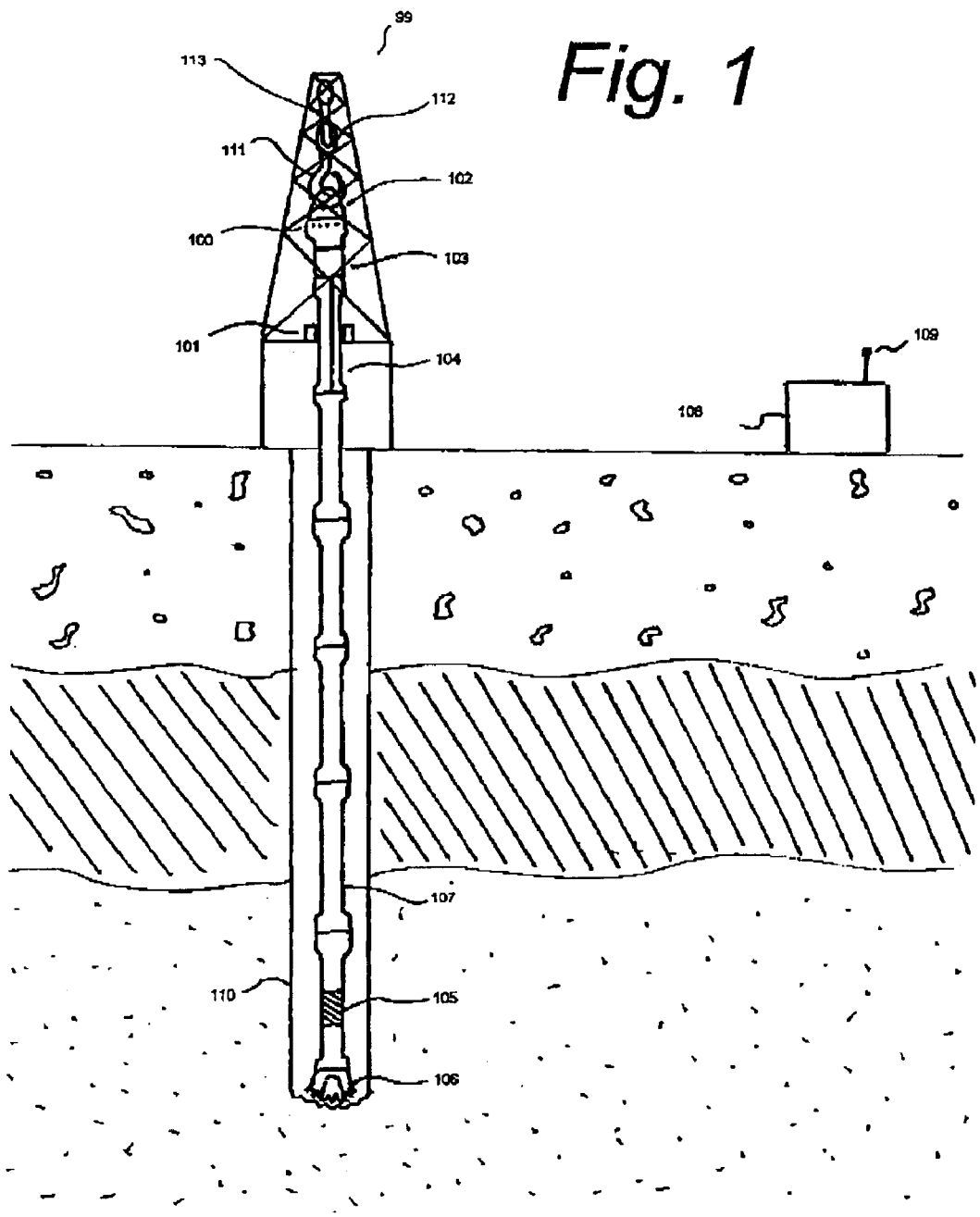
FIG. 1 is a schematic elevation view of a conventional drilling rig and a safe area monitoring station.

FIG. 1 provides a simplified representation of a typical drilling rig 99. Boreholes 110 are drilled into the earth with a drill string comprising a drill bit 106 connected to the surface by multiple joints of drill pipe 107. A downhole acoustic transmitter and sensors 105 may be located near the bit, to provide information about the formation geology, fluid pressure, wellbore geometry, etc. Additional and/or alternative bottom hole assembly (BHA) components such as positive displacement motors, air hammers, rotary steerable devices, and other devices may be present. The drill pipe 107 is threaded into a square or hexagonal section pipe called a kelly 104 which is driven by a rotary table 101. Typically, the kelly 104 is attached to the swivel 100 via a saver sub 103. The swivel 100 is supported by a bail 102 which is carried by a hook 111, attached to traveling blocks 112. The traveling blocks 112 are lifted and lowered by a cable assembly 113.

Figure 2:
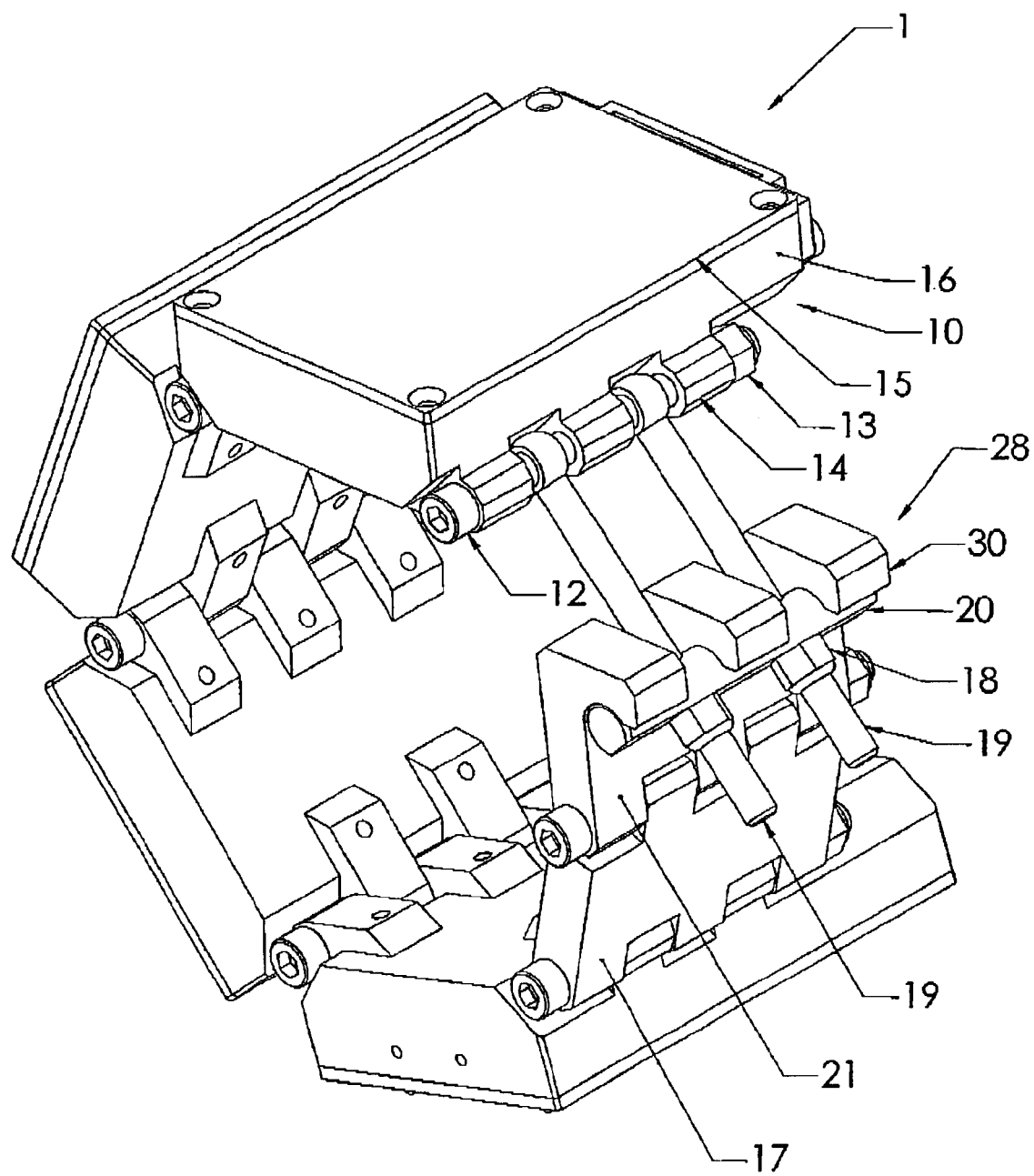
FIG. 2 is an isometric view of an embodiment of an apparatus for receiving downhole acoustic signals.

According to an embodiment of the invention, and referring to FIG. 2, an apparatus 1 for receiving downhole acoustic signals is removably attachable to an above-surface rotating component of the drill string, below the bearing surface of the swivel 100, and preferably on the saver sub 103, or the top portion of the kelly 104. These preferred locations provide the optimum acoustic location on the drilling rig 99; the bearing surface and the change in acoustic impedance between the drill string and the swivel 100 act as an acoustic reflector, and thus all points above the swivel 100 only contains a small fraction of the acoustic energy generated downhole.

While the description of the apparatus 1 is in the context of use on a drilling rig, it is to be understood that the apparatus 1 may also be attached to a service rig, slant rig, well head, or other surface equipment associated with boreholes in the earth.

The apparatus 1 includes a plurality of housings 10 each linked together with a bolt 12 and nut 13 which act as a pivot for a hinge 14 integrated into each housing 10. The housings 10 contain instruments 2 for receiving acoustic signals, processing the acoustic signals into electronic data, and transmitting the data as RF signals to an above-surface monitoring station 108 (as shown in FIG. 1). The acoustic signals are transmitted from the downhole acoustic transmitter 105, and through a transmission medium, typically the drill pipe 107, kelly 104, and the saver sub 103.

Figure 8:
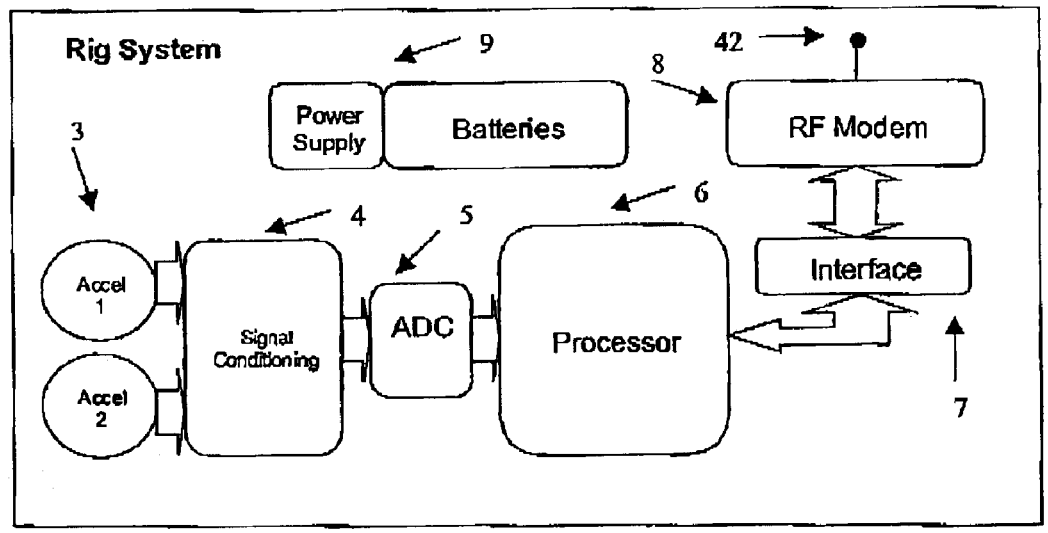
FIG. 8 is a system diagram of instruments inside the housing of the apparatus.

Referring to FIG. 8, the instruments 2 comprise two accelerometers 3 which are electrically communicative with conditioning circuitry 4. The accelerometers 3 measure axial accelerations associated with acoustic wave signals transmitted from the downhole acoustic transmitter 105. As acoustic waves pass through the saver sub 103, the sub 103 and the housing 10 attached to it are moved in a oscillating manner. Since the accelerometers are attached to the housing which is oscillating, they are also oscillated. The accelerometers measure the accelerations associated with the oscillations by producing a voltage signal proportional to the magnitude of the acceleration they experience.

Signals from the accelerometers 3 are electrically transmitted to the signal conditioning circuitry 4 for conditioning, then output of the signal conditioning circuitry 4 is sampled by an analog-to-digital converter (ADC) 5. The sample signals are transmitted to a processor 6, which takes these samples, and encodes them in a suitable communication protocol, and transmits the encoded signal through an interface 7 to a transmitting radio-frequency (RF) modem 8. A power supply 9 such as batteries are electrically connected to the instruments 2 to power same.

Alternatively, the accelerometers 3 can be calibrated to receive downhole acoustic signals from sources other than the acoustic transmitter 105. In such case, the apparatus 1 serves as a monitor of downhole conditions, and for example, can be used to monitor the operation of a downhole air hammer (not shown) by monitoring the acoustic signals emitted by the air hammer as a result of its operation.

Figure 9:
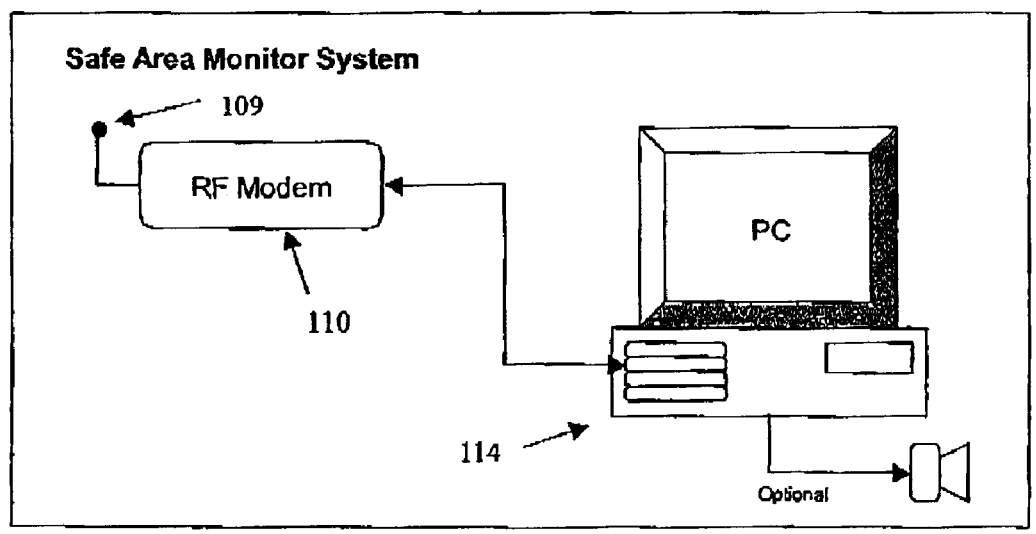
FIG. 9 is a schematic diagram of a safe area monitoring station for receiving RF signals from the apparatus.

Referring now to FIGS. 1, 8, and 9, RF signals are transmitted by the modem 8 via an antenna 42 and are received by a monitoring station antenna 109 in a safe area monitoring station 108. The received signal is transmitted from the antenna 109 to a connected receiving RF Modem 110, where the signal is decoded and transmitted to a connected portable computer 114 or other similar display device. This wireless transmission allows the apparatus 1 to operate continuously, regardless of the rotation state of the drill string. It also provides the additional benefit of eliminating the need to run cabling around the drill rig 99 and monitoring station 108, which would be prone to damage or interfering with the drilling operation. The modem 8 and antenna 42 can also receive signals transmitted by the monitoring station 108, and as such serves as a wireless RF transceiver.

Referring again to FIGS. 2 and 3, the housing 10 serves as a protective enclosure for the instruments 2 against the harsh outside environment of the drilling rig 99. The housing 10 includes a cover 15 and an instrument bay 16 covered by the cover 15. The instrument bay 16 has side walls and a base; two sets of hinges 14 protrude from the outside surface of the base, one set at each longitudinal edge thereof. The cover 15 seals against an o-ring seal (not shown) located in a groove (not shown) in the lip of the instrument bay side walls. In the event the apparatus 1 is used in hazardous conditions, the seal prevents potentially explosive gases from entering into the housing 10 and coming in contact with a source of ignition. The seal also prevents rain, dust, oil, or other contaminants from entering the housing 10, which could damage the instruments 2. The instruments 2 may be shock isolated by an elastomer (not shown) inside the housing 2; such isolation is especially preferred where the apparatus 1 operates in high shock and vibration environments.

Four housings 10 are provided to house the instruments 2 and power supply 9; the housings 10 are pivotably interconnected at their respective hinges 4 by the bolts 12 and nuts 13. At the housing 10 at one end of the line of interconnected housings 10, one set of hinges is pivotably connected to a spacer member 17. The spacer member 17 has a slab-like body with two sets of hinges, with each set of hinges located at each longitudinal edge of the body. The other set of hinges of the spacer member 17 is pivotably attached to a hook 21, which has three spaced-apart teeth 30.

The hook 21 is one component of a fastening assembly 28. The fastening assembly 28 also includes a pair of rod end eyebolts 19 pivotably attached at their proximal end to the housing 10 at the other end of the interconnected housings 10. The eyebolts 19 are spaced apart and generally parallel to each other, and extend perpendicularly from the pivot bolt 12. A bolt bar 20 has a pair of holes extending transversely through its body, that are configured to allow the eyebolts 19 to slide through the bolt bar 20. The eyebolts 19 are threaded near their distal ends, and tightening nuts 18 are used to secure the bolt bar 20 to the eyebolts 19.

Figure 3:
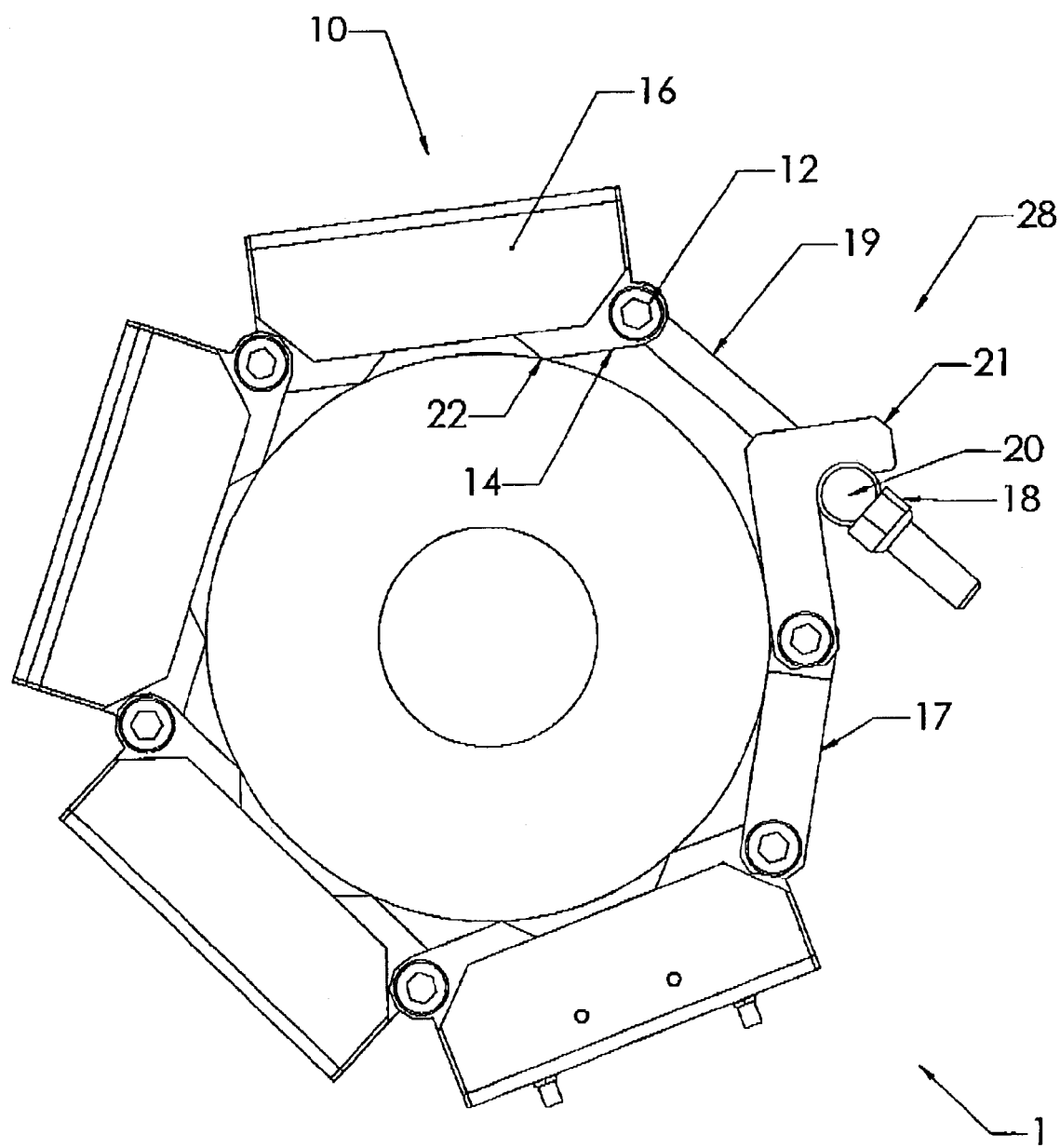
FIG. 3 is a schematic top view of the apparatus of FIG. 1 attached to an above-surface rotating component of a drilling rig.

The fastening assembly 28 engages by hooking the hook 21 onto the bolt bar 20 such that the eyebolts 19 extend between the spaces between the hook teeth 30. Referring to FIG. 3, the apparatus 1 can be wrapped around a tubular portion (e.g. the saver sub 103) and secured in place by tightening the nuts 18 against the eyebolts 19. Contact teeth 22 are provided to enhance the physical attachment of the apparatus 1 to the tubular portion. The teeth 22 also serve to enhance acoustic conduction between the rotating component and the housing 10, by providing a high pressure contact interface. The teeth 22 protrude from base of the instrument bay 16; in this embodiment, the teeth are an integral part of the protruding hinges 14, but the teeth 22 may also separately protrude from the instrument bay 16 base.

Figure 4:
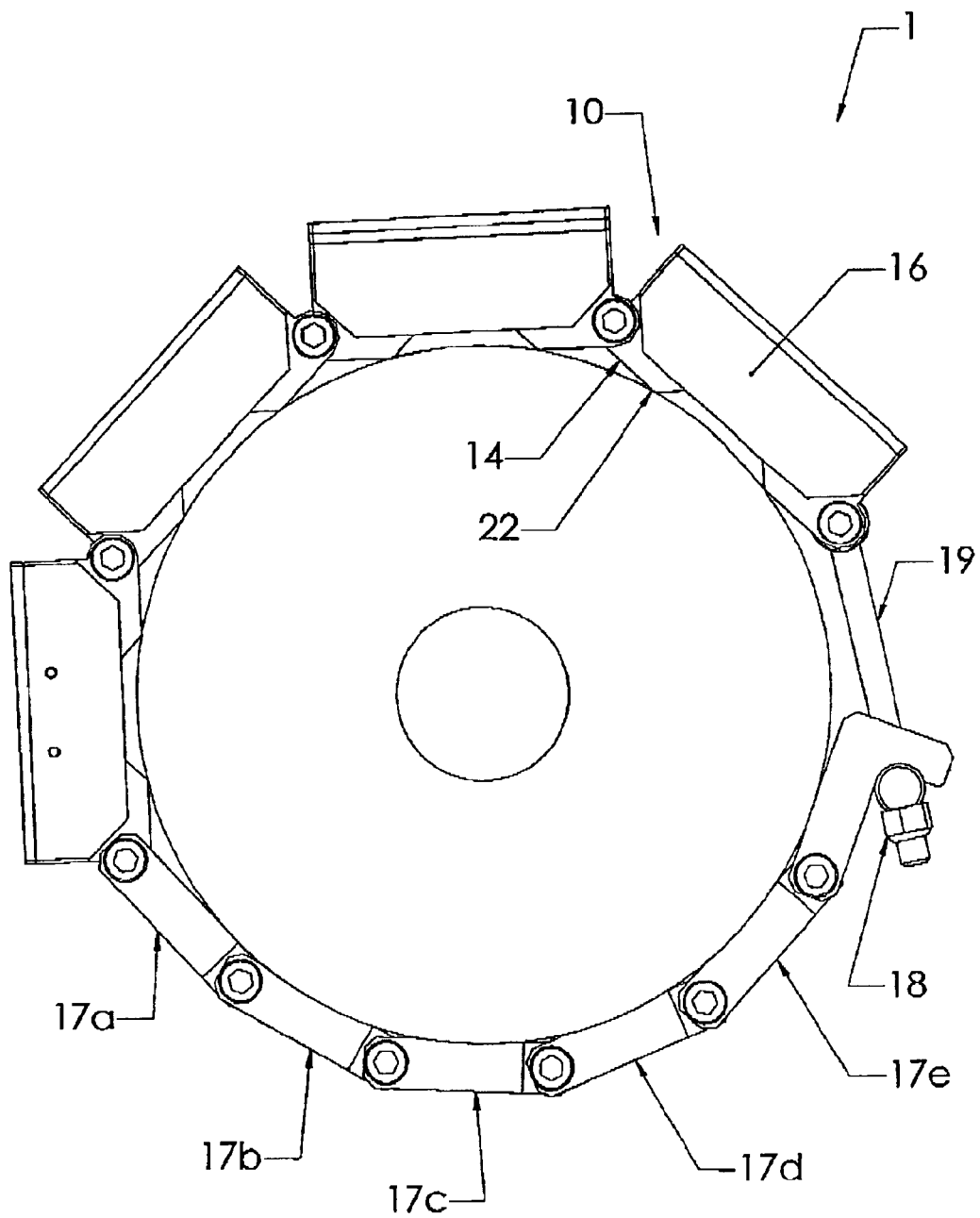
FIG. 4 is a schematic top view of an embodiment of an apparatus for receiving downhole acoustic signals having four housings and five spacer members and mounted on a 12" diameter tubular portion of the drilling rig.

Referring to FIG. 4, additional spacer members 17(b), 17(c), 17(c), 17(d), and 17(e) may be added to the first spacer member (now referred to as 17(a)) to enable the apparatus 1 to surround larger diameters tubes such as the 12" section shown in FIG. 4, or to other larger perimeter components. Also, the number of housings 10 may be increased or decreased depending on the number of instruments 2 needed. Multiple housings 10 in the apparatus 1 are desirable to enable the diametrical profile (the height of the side walls) of the housings 10 to be minimized. This enables the apparatus 1 to be attached to and rotate with an above-surface rotating component without coming into contact with non-rotating parts of the drilling rig 99.

Referring now to FIGS. 5 and 6, a flexible hydraulic hose 23 may be used to provide a protected conduit between adjacent housings 10, for electrical connectors (not shown) to interconnect instruments 2 in the adjacent housings 10. A drilled hole 25 is provided in each adjacent housing 10, and each end of the hose 23 has a hollow barbed fitting 24 that secures each end of hose 23 in the hole 25 of each housing 10. The barbed fitting 24 expands the hydraulic hose in the drilled hole 25, thereby forming a secure sealed connection. External tapered ridges (barbs) 26 are provided on the fitting 24 prevent the fitting 24 from coming out of the hole 25 due to flexure or vibration. The hydraulic hose 23 protects the electrical connectors from moisture or contact with rig equipment that may otherwise damage it.

Figure 7A:
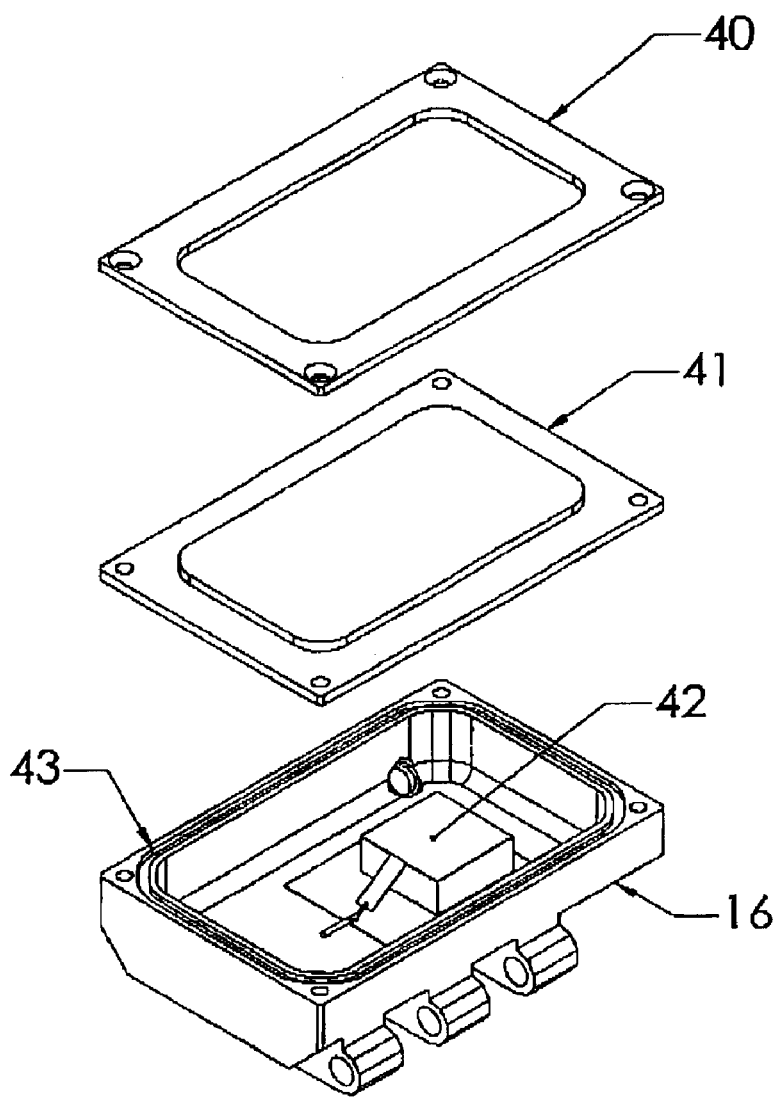
FIG. 7a is an exploded isometric view of a housing with transparent window and antenna.
Figure 7B:
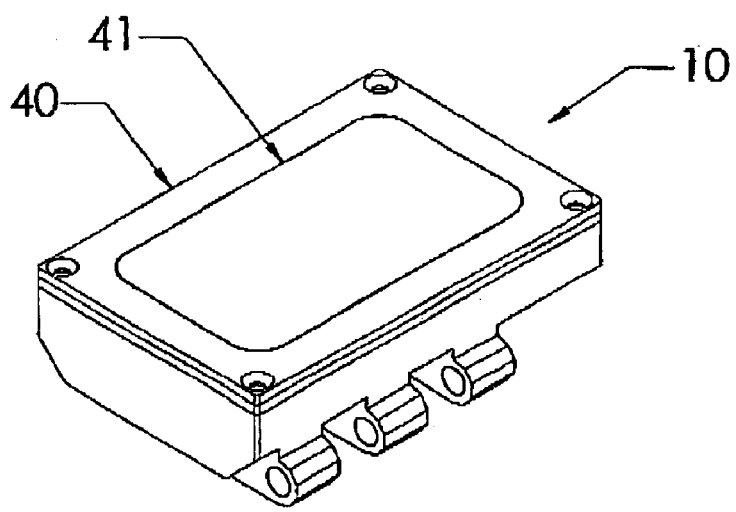

During rotary drilling, the apparatus 1 will rotate with the drill string, but must still be able to communicate with a display device, typically a portable computer located in a safe area, and thus a hardwired communication means is not possible. The current invention uses a RF modem to provide this communication link. Referring now to FIGS. 7a & b, the RF antenna 42 is enclosed in the instrument bay 16 of one of the housings 10. This housing 10 has a RF-transparent cover 41, and retaining plate 40 for the cover 41. An o-ring (not shown) located in a groove 43 machined in the instrument bay 16 to form a seal against the RF-transparent cover 41. The RF-transparent cover 41 is preferably made from an impact-resistant plastic, such as polycarbonate, compatible with the temperature extremes found on drilling locations. Although the RF transmission occurs substantially perpendicular to the plane of the RF transparent cover 41, the reflections in the rig structure provide what is known to those skilled in the art as a multi-path environment. In effect, multiple reflections provide a substantially continuous RF path between transmitter and receiver pair, thereby enabling continuous data transmission. This effect is particularly important as the transmitter may be rotating due to the operation of the drill string.

Optionally, the apparatus 1 may be configured to send as well as receive acoustic signals from the downhole acoustic transmitter 105.

While the present invention has been described herein by the preferred embodiments, it will be understood by those skilled in the art that various changes may be made and added to the invention. The changes and alternatives are considered to be within the spirit and scope of the present invention.

What is claimed is:

1. An apparatus for receiving downhole acoustic signals, comprising:
   (a) at least one instrument housing made of an acoustically conductive material, and comprising a contacting portion contactable with a rotatable above-surface component used in borehole applications, in such a manner that acoustic signals from the rotatable above-surface component is conducted through the housing;
   (b) instruments inside the housing comprising a transducer for converting acoustic signals conducted through the housing into electric signals, a data acquisition circuit communicative with the transducer, and a wireless transmitter communicative with the data acquisition circuit and for wirelessly transmitting the electric signals to a remote destination; and
   (c) a clamping assembly attached to the instrument housing and having sufficient length and flexibility to enable the apparatus to surround the perimeter of the rotatable above-surface component, and comprising a fastener configured to removably fasten the apparatus to the rotatable above-surface component, thereby enabling the apparatus to operate while the rotatable above-surface component is rotating.

2. The apparatus of claim 1 wherein the clamping assembly further comprises a plurality of members each pivotably connected to one or more of another member, the housing, and the fastener.

3. The apparatus of claim 2 wherein at least some of the members are removable, thereby enabling the clamping assembly length to conform to the perimeter of the rotatable above-surface component.

4. The apparatus of claim 2 wherein the housing contacting surface further comprises at least one contact tooth.

5. The apparatus of claim 1 wherein the rotatable above-surface component is selected from the group of a kelly and a saver sub of a drilling rig.

6. The apparatus of claim 2 comprising a plurality of housings pivotably connected to one or more of another housing, the clamping assembly member, and the fastener.

7. The apparatus of claim 6 wherein a pair of housings are adjacent to each other and each have a conduit opening, and the acoustic signal receiver further comprises a flexible conduit connected at each end to a conduit opening, and an electrical connector passing through the conduit and electrically connecting the instruments in one housing to the instruments in the adjacent housing.

8. The apparatus of claim 1 wherein the housing further comprises an RF transparent portion, and an RF antenna mounted inside the housing such that the antenna can receive and transmit RF energy through the RF transparent portion.

* * * * *